Nov. 12, 1929.  C. B. SCOVILLE, JR  1,735,339
BRAKE OPERATING MECHANISM
Filed Feb. 4, 1924
Fig. 1.
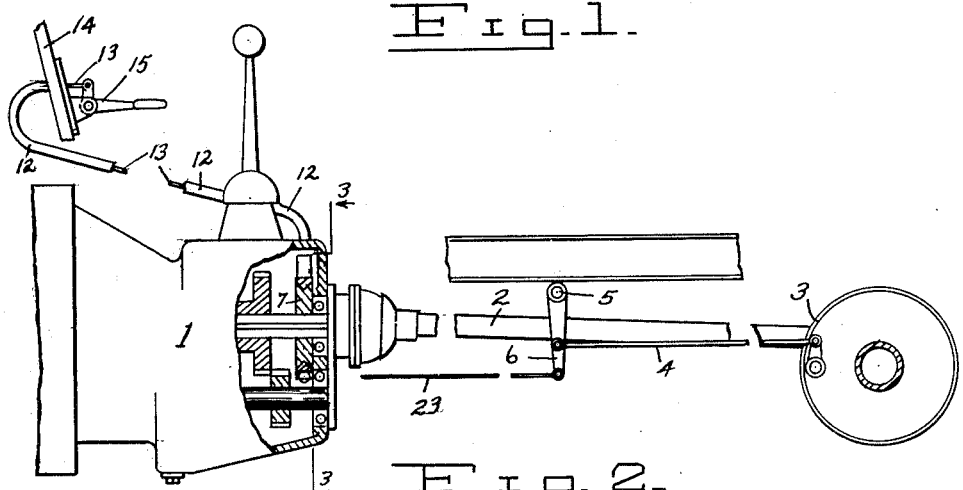
Fig. 2.
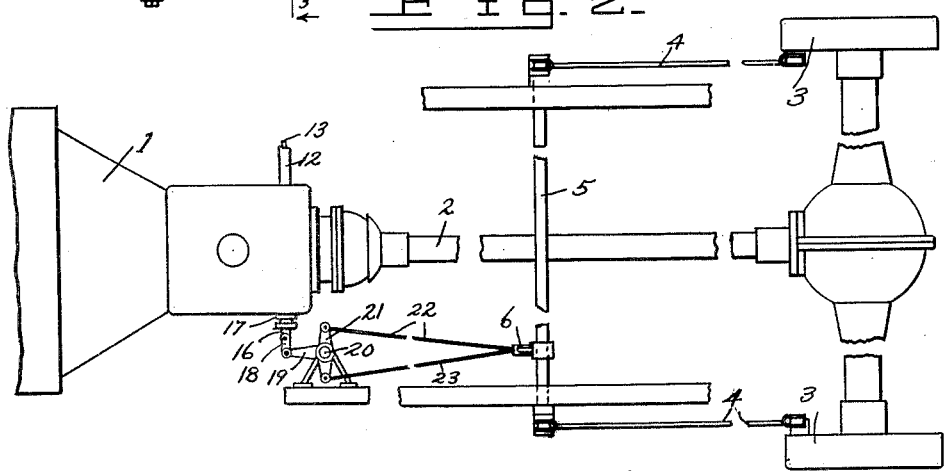
Fig. 3. Fig. 4.
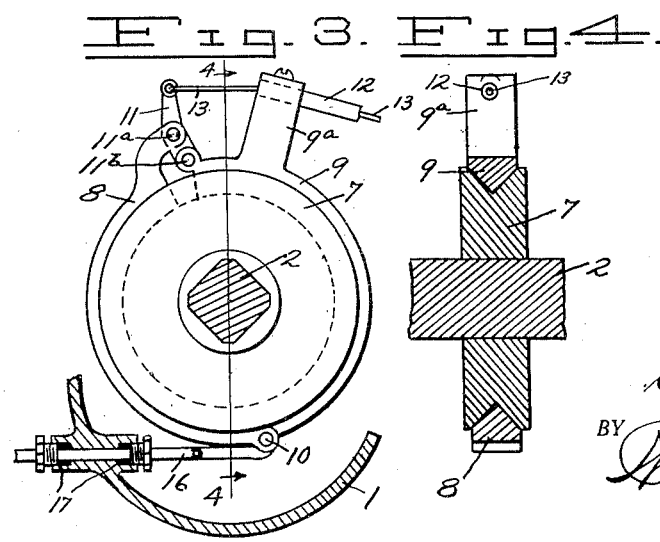
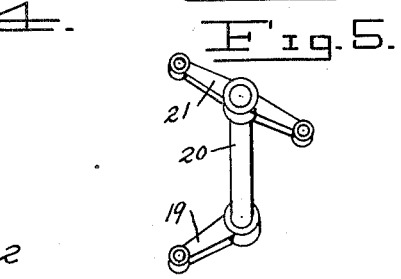
Fig. 5.
INVENTOR.
Charles B. Scoville, Jr.
BY
ATTORNEY.

Patented Nov. 12, 1929

1,735,339

UNITED STATES PATENT OFFICE

CHARLES B. SCOVILLE, JR., OF PASADENA, CALIFORNIA

BRAKE-OPERATING MECHANISM

Application filed February 4, 1924. Serial No. 690,388.

The principal object of my invention is to provide a simple, practical and effective brake-operating device, itself operated by a driven part of the vehicle on which it is used, whether that driven part is operated by the motor or by the momentum of the vehicle. For example, I have illustrated my invention as connected for operation from the propeller shaft of an automobile, with a small lever for setting the brake-operating device into action. This small lever can be placed in any convenient position for operation either by hand or foot, as may be desired. The operation of the standard brake mechanisms as they are now installed on motor vehicles, is made somewhat similar in action to the well known air brake by my invention.

In order to explain my invention, I have illustrated a practical embodiment thereof on the accompanying sheet of drawings, which I will now describe.

Figure 1 is a side elevation of a transmission case of an automobile with my invention connected therewith;

Figure 2 is a top plan view thereof;

Figure 3 is an enlarged side view of one embodiment of my invention detached;

Figure 4 is a sectional view therethrough, on line 4—4 of Fig. 3; and

Figure 5 is a detail.

Referring now in detail to the drawings, 1, designates the transmission case, 2, the propeller shaft, 3, the usual or standard brake mechanism, 4, 4, the brake rods, extending from the cross shaft, 5, on which is mounted a lever for turning said cross shaft to apply the brakes. This mechanism is of well known construction and forms no part of my invention except that my invention is designed to operate said cross shaft to apply the brakes.

My invention as here illustrated for descriptive purposes, comprises a grooved or V drum 7, mounted on the propeller shaft, 2, within the transmission case, as indicated in Fig. 1. Loosely mounted around said drum, 7, are two shoes, 8 and 9, machined to the same pitch as the groove, and pivoted together, as at 10, and operatively connected at the opposite side of said drum by means of a lever, 11, pivoted to the shoe 8, at 11ª, and at 11ᵇ to the shoe 9, whereby when said lever is moved in one direction, said shoes 8 and 9 are moved to grip onto said drum, and when moved in the opposite direction, said shoes are released. On the drum shoe 9, is formed an extension, or bracket, 9ª, in which is connected a tube 12, through which runs an operating wire, 13, which connects to the outer end of the lever, 11, as illustrated in Fig. 3. Said tube is extended to a support, 14, within reach of the operator, on which is an operating lever, 15, connected to the wire 13, as illustrated in Fig. 1, for operating said wire 13, through said flexible tube, to operate the lever 11 and the drum shoes, 8 and 9, as will be clear from Figs. 1 and 3. Connected to the lower side of the drum shoes, 8 and 9, at their hinge 10, is a rod 16, running through a stuffing box, 17, in the casing, 1, as shown in Fig. 3. Said rod 16 is connected by means of a link, 18, to an arm 19, on a shaft 20, on which is a cross arm 21, from the opposite ends of which run operating steel cables, 22 and 23, connected to the lever 6, on the cross shaft, 5, which operates the brakes 3, 3, as hereinbefore referred to.

It will be understood that the drum 7, is running in oil with the propeller shaft 2, and that when the operating lever 15, is manipulated to cause the shoes 8 and 9 to be closed upon said drum 7, said shoes do not lock themselves to said drum, or form any permanent connection with it, but slidingly grip it sufficiently to cause them to be retarded therewith, which action operates to pull the rod 16, and through its connections to the rocker arm 21, apply the brakes 3, 3, in the same manner that they would be applied by the operation of the usual brake lever under present arrangement. Thus with a minimum of effort, or pressure on the control lever 15, the power developed by the momentum of the vehicle, or by the motor in driving the propeller shaft, is utilized to apply the brakes for stopping the machine.

While I have shown but one embodiment of my invention for descriptive purposes, I am aware that many changes in details can be made in the construction and arrangement thus shown without departing from the spirit of the invention, and I do not, therefore, limit the invention to the showing made, except as I may be limited by the hereto appended claims.

I claim:

1. Means for operating the brake bands of a vehicle including in combination, a driven shaft, a grooved drum on said shaft, two brake shoes conforming in cross section to said groove and adapted to be compressed on to said drum to turn yieldingly therewith, manually operable means for compressing said brake shoes at will, a pull rod connected tangentially with said brake shoes, a rocker arm connected to be operated by said pull rod when said brake shoes are turned with said drum, and operating connections from said rocker arm to the brake bands of said vehicle.

2. In combination with a vehicle having brake bands and a driven shaft, of means for operating said brake bands from said driven shaft including in combination, a drum on said shaft and driven thereby, two brake shoes around said drum and adapted to be compressed on said drum to turn therewith, manually operable means for compressing said brake shoes, a pull rod pivotally connected to said brake shoes and extended therefrom tangentially, a housing enclosing said drum, a stuffing box through which said pull rod extends from said housing, a rocker arm connected to said pull rod, and operating connections from said rocker arm to the brake bands of said vehicle, substantially as shown.

Signed at Los Angeles, Los Angeles county, California, this 26th day of January, 1924.

CHARLES B. SCOVILLE, Jr.